No. 619,408. Patented Feb. 14, 1899.
J. A. HEANY.
WHEEL FOR VEHICLES.
(Application filed Jan. 27, 1898.)
(No Model.) 2 Sheets—Sheet 1.
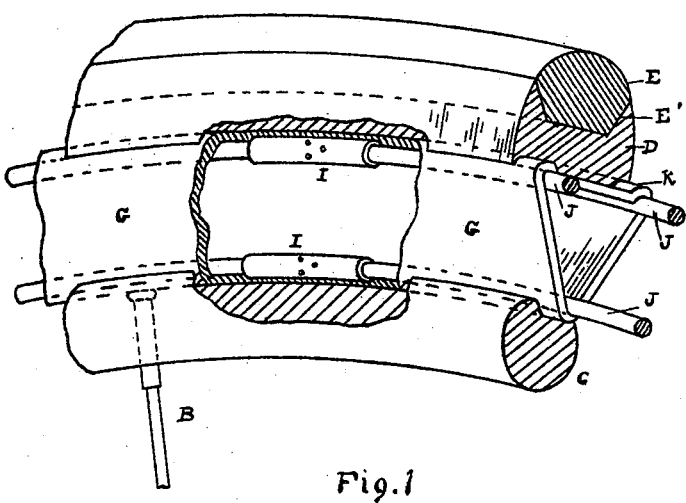
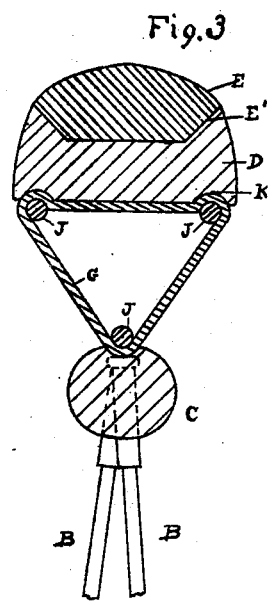
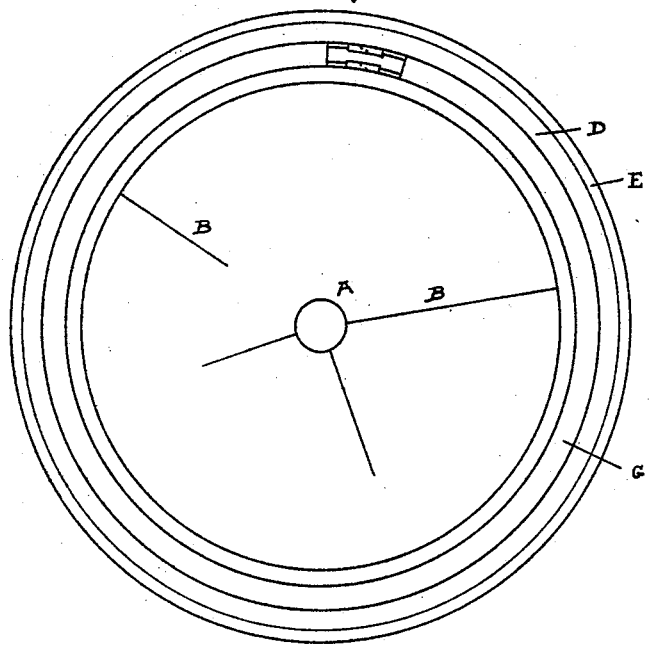
WITNESSES:
Andrew Brogan
Albert E. Zacherle
INVENTOR
John Allen Heany No. 619,408. Patented Feb. 14, 1899.
J. A. HEANY.
WHEEL FOR VEHICLES.
(Application filed Jan. 27, 1898.)

(No Model.) 2 Sheets—Sheet 2.

WITNESSES: Andrew Brogan Albert E. Zacherl

INVENTOR John Allen Heany

UNITED STATES PATENT OFFICE.

JOHN ALLEN HEANY, OF PHILADELPHIA, PENNSYLVANIA.

WHEEL FOR VEHICLES.

SPECIFICATION forming part of Letters Patent No. 619,408, dated February 14, 1899.

Application filed January 27, 1898. Serial No. 668,132. (No model.)

*To all whom it may concern:*

Be it known that I, JOHN ALLEN HEANY, a citizen of the United States, and a resident of Philadelphia, Pennsylvania, have invented certain new and useful Improvements in Wheels for Vehicles, of which the following is a description, reference being had to the annexed drawings, making part hereof.

The nature and object of my invention will be best understood from the following specification and claims.

Briefly stated, my object is to provide a wheel equal, or nearly so, or possibly superior in resiliency and other attributes to the wheel provided with a pneumatic tire and which will travel without danger of wreck over rugged surfaces—from crossing a series of upturned carpet-tacks, broken glass, or a turnpike of broken uncovered stone to safely passing over a ridge of the Rocky Mountains.

As to the nature of my invention, it consists of two stiff hoops or rims circular, concentric, and entirely out of contact one with the other. The inner rim holds between itself and the hub a number of radiating spokes centering to the hub; but between this inner rim and the outer one, which may be called the "felly," there must be some connection because of the open air-space between them. Now the means of connection between the outer surface of the inner rim and the inner face of the felly holds my whole invention, or very nearly so, for I have a tread-band or tire as well as those who have preceded me with a pneumatic tire.

By means of a gum (say, caoutchouc) and its compounds a substance has been produced, called "rubber," which possesses flexibility, spring, and elasticity. For a generic term let any gum so pleasantly treated as to possess such attributes be called "rubber."

I connect my rim with my felly by a rubber tube or tubes in such a way that the rim is held in suspension from the felly; but the tube or tubes, short or long, are held to and between the separated rim and felly by metallic (or other suitable material) holders passing through its or their interiors and attached to the respective rim or felly, so as to suspend the former from the latter.

Figure 4:
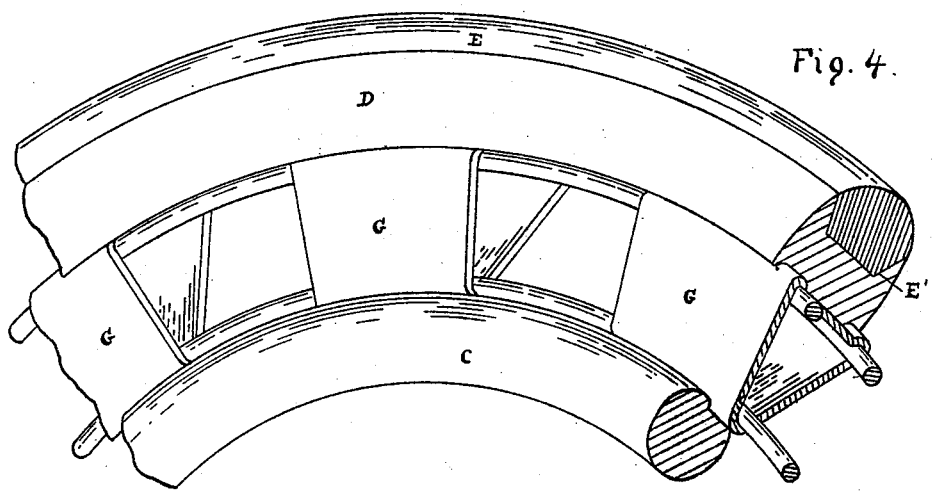
Figure 6:
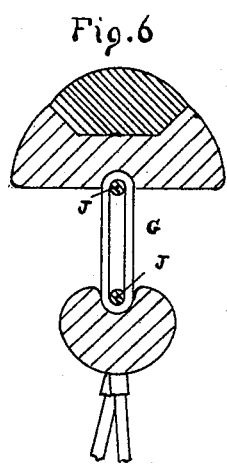
Figure 5:
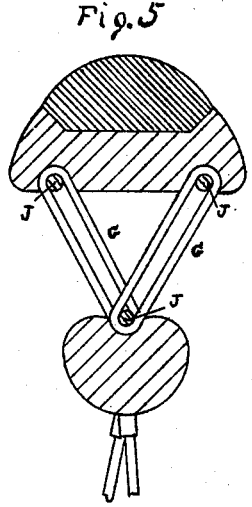

In the drawings, Figure 1 is a side elevation of my device, showing the inner rim, the felly, and rubber tire and the distended rubber tube between rim and felly and the right and left screw-threaded nuts, sleeves, or clamps to draw together or distend the rods within said tube, the curved parts being concentric; Fig. 2, a broken perspective view of a section of my device, showing the adjacent ends of the curved tube with an open space between them, the right and left screw-threaded clamps, by the turning of which the ends of the rods with which they respectively engage are drawn together or forced apart, and also showing the rods broken off to illustrate their positions; Fig. 3, a cross-sectional view of the rim, felly, and tire and the parts embracing my invention; Fig. 4, a broken section in perspective showing the long hollow tube supplanted by a series of short tubes between the rim and the felly; Fig. 5, a cross-sectional view of the rim, felly, and tire, illustrating a series of narrow rubber bands or loops each secured at its inner turn around the inner securing-rod of the inner rim and the outer turns of the loops being alternately secured around the two outer securing-rods of the felly; Fig. 6, a similar view showing only two securing-rods with a tube or bands secured or distended between them.

A is the hub; B B, the spokes, both of ordinary well-known construction; C, the inner rim; D, an outer rim, which I shall call the "felly;" E, an outer rubber tire sprung into another groove E' in the felly. The rim C and felly D are concentric and of such differing diameters as to leave an open space between them.

G is a simple rubber tube completely around and filling the open space between rim and felly, excepting at the point, say, H, where it must be left open to reach and operate screw-clamps I.

J J J' are metallic rods set within tube G and provided with screw-threaded ends to engage with the female screw-threaded interiors of clamps I I.

K K K' are continuous grooves, two being longitudinally sunk in the interior surface of felly D and one in the exterior outer surface of rim C.

Rods J J and J' are set in the interior of tube G so that the ends will reach an opening H. The tube, with its inner contained rods, is then sprung into place inside the felly and the rods J J are distended by so turning the clamps I of the outer rods J J that the ends of each rod will be driven apart and so that the rods will bind the tube for its whole length (where they impinge) into grooves K K, thus holding the tube firmly within the felly. The rim C is now set within the parts so joined and the clamp I of rod J' is so turned as to draw the ends of said rod toward each other, thus binding the tube firmly around rim C. It may be stated that the tube G is of such size that this action of stretching it between the tire and felly distends it laterally, making it tight. The inner rim and the felly are not only concentric, but in the same plane in the line of their mutual diameter.

The opening H may be closed after being utilized, as described, by a flap or cover of any description, or such openings may be repeated at intervals for purposes of cleanliness. If the opening is closed, soil and mud will be excluded from the interior of the tube. If it is repeated at intervals and the openings are left exposed, the tube or tubes thus formed may be easily cleansed by means of a jet of water.

Fig. 4 shows the tube cut up into a number of short sections L L, forming bands. Figs. 5 and 6 of Sheet 2 show modifications of these bands or short tubes held distended between the rim and felly by means of rods.

It will be observed that by the invention here shown the inner rim, which directly sustains the weight of the vehicle and load, hangs suspended from the outer rim or felly.

As intimated above, the two ends of each rod do not meet each other, but a space is left between these ends, whereby they can be drawn toward each other or forced apart by the action of the screw-clamps I I. It will be observed that the tube in cross-section forms a triangle. This may of course be varied so as to form any other angular figure in cross-section, the object being to fully distend the tube in order to guard against deflection of the felly out of its plane in making sharp curves. The other geometric figures (cross-sections of the tube) may be formed by simply increasing the number of the rods.

What I claim as new is—

1. In a wheel for vehicles, in combination with a hub and spokes, a stiff inner rim and a stiff outer felly, concentric with said rim, with a space between them; a rubber tube or tubes set between said rim and felly, binding-rods J J', set within said tube to distend the latter into a groove K in the inner face of the felly and to compress it into a groove K' in the outer face of the inner rim; the opposing ends of each of said rods being separated and screw-threaded and joined by a right and left female screw-threaded clamp; whereby, the inner rim and outer felly are secured together, substantially as described.

2. In a wheel for vehicles, the combination of a hub A; spokes B B; inner rim C; felly D; interposed elastic tube G; metallic rods J J J', set within said tube and provided with screw-threaded ends, slightly separated, rim and felly being grooved at K K'; right and left screw-threaded clamps I I, adapted to engage with said rods and by the turning of which said rods may be distended or contracted; said rods being so disposed as to throw the tube into a triangular, or angular geometric form in cross-section, substantially as and for the purposes described.

JOHN ALLEN HEANY.

Witnesses:
GEORGE E. BUCKLEY,
ANDREW BROGAN.